(No Model.)

G. W. & G. S. HUNGERFORD.
MACHINE FOR SCOURING COFFEE, &c.

No. 253,054. Patented Jan. 31, 1882.

Witnesses.
L. Nahlers.
W. Miller.

Inventors.
George W. Hungerford
George S. Hungerford
by Van Santvoord & Hauff,
Attys.

UNITED STATES PATENT OFFICE.

GEORGE W. HUNGERFORD AND GEORGE S. HUNGERFORD, OF NEW YORK, N. Y.

MACHINE FOR SCOURING COFFEE, &c.

SPECIFICATION forming part of Letters Patent No. 253,054, dated January 31, 1882, Application filed December 7, 1881. (No model.)

*To all whom it may concern:*

Be it known that we, GEORGE W. HUNGERFORD and GEORGE S. HUNGERFORD, both citizens of the United States, residing at New York, in the county and State of New York, have invented new and useful Improvements in Machines for Scouring Coffee or other Similar Materials, of which the following is a specification.

This invention relates to machines for scouring coffee, rice, or other similar materials, and especially that class of machines embodying two cylinders revolving in opposite directions, one within the other, and having their opposed surfaces provided with teeth to be forced through the coffee as it passes between the cylinders, as shown and described, for example, in Letters Patent of the United States granted to us November 22, 1881, No. 249,943.

Our present invention consists in arranging the teeth of the outer cylinder in sets extending longitudinally and alternating with blank spaces, so that the coffee is received in the blank spaces, and being thus brought directly into the path of the teeth a positive action of the teeth is insured. The outer cylinder is constructed with side staves, which are alternately provided with teeth, forming the sets referred to, so that the staves act as gages for determining the positions of the sets of teeth. In the discharging end of the outer cylinder is a screen, allowing the escape of dust, &c., and to support such screen against the weight of the coffee the side staves alternately extend the entire length of the cylinder, as hereinafter more fully set forth.

Figure 1:
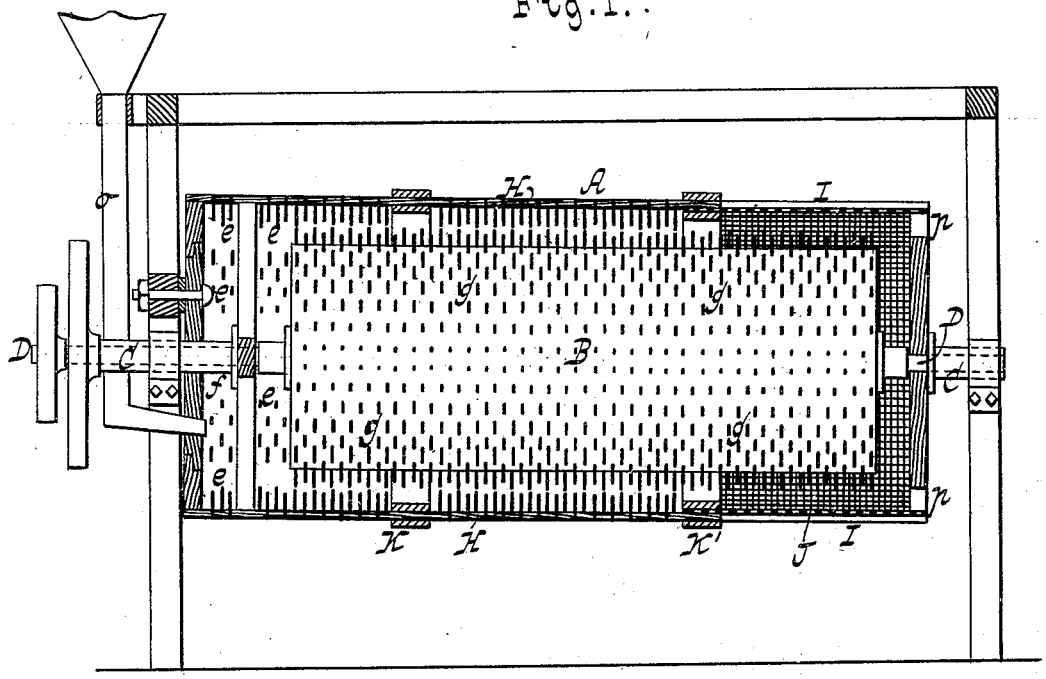
Figure 2:
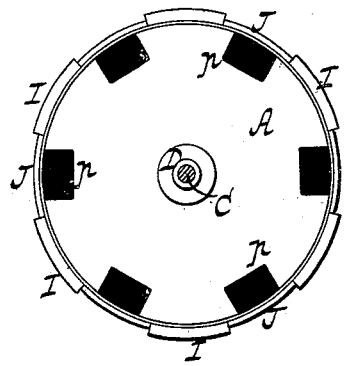
Figure 3:
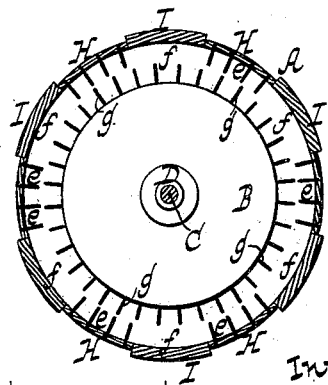
Figure 4:
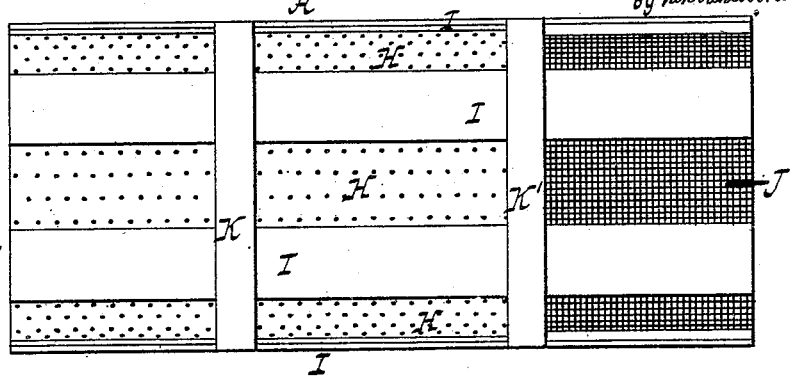

This invention is illustrated in the accompanying drawings, in which Figure 1 represents a longitudinal central section. Fig. 2 is an end view. Fig. 3 is a cross-section. Fig. 4 is a side view.

Similar letters indicate corresponding parts.

The letter A designates the outer cylinder, and B the inner cylinder, mounted on shafts C D, whence they receive a revolving motion in opposite directions, the outer cylinder being fed through a hopper, *o*, and discharging through ports *p*.

*e* are the teeth of the outer cylinder, the same being arranged in sets extending in a longitudinal direction and alternating with blank spaces *f*, (see Fig. 3,) and *g* are the teeth of the inner cylinder.

H I are the staves of the outer cylinder, and J its screen, the staves H being the parts carrying the teeth *e*, and the staves I forming the blank spaces. The screen J is made of wire-cloth or other foraminous material, and is located at one end of the outer cylinder—namely, at its discharge end—and the staves I extend the entire length of the cylinder, while the stave H terminates at the inner end of the screen.

Rings K K' are used for joining the staves H I intermediate of the cylinder, the ring K' serving also to join the screen J to the staves.

It will be seen that by the arrangement of the teeth *e* of the outer cylinder the coffee or other material introduced between the cylinders is received in and fills the blank spaces *f*, which being in the path or line of motion of the teeth, the latter are caused to act positively on the material—namely, from point to base, or throughout their entire lengths—and hence the effect of the teeth is materially improved. Another advantage gained by the blank spaces *f* is that the teeth *e* are less liable to become clogged with the dirt or other matter removed from the coffee.

By constructing the outer cylinder with the side staves, H I, no difficulty is had in effecting the desired arrangement of the teeth *e*, the staves acting as gages for this purpose, while by extending the staves I the entire length of the cylinder a substantial support is thereby afforded to the screen J against the weight of the material under treatment, sufficient of the screen being at the same time left bare for allowing it to perform its proper function.

A machine has heretofore been made with longitudinal ribs on the inner surface of the outer cylinder, acting as carriers to throw the coffee upon the teeth of the inner cylinder. This construction is objectionable for the reason, among others, that the fibers, dust, and other foreign matters separated from the coffee lodge against the sides of the ribs and fill up the greater part of the spaces between them, thus clogging the teeth and rendering the same inoperative. The vacant spaces *f* overcome such objection, because forming channels by which the impurities are allowed to escape.

What we claim as new, and desire to secure by Letters Patent, is—

1. The outer cylinder having its inner surface provided with teeth which are arranged in sets extending longitudinally and alternating with blank spaces, in combination with the inner cylinder having teeth on its outer surface, substantially as shown and described, for the purpose set forth.

2. The outer cylinder constructed with side staves which are alternately provided with teeth on the inner surface of such cylinder, in combination with the inner cylinder having teeth on its outer surface, substantially as described, for the purpose set forth.

3. The outer toothed cylinder having a screen located at one end thereof, and staves alternately terminating at the inner end of the screen and extending the entire length of the cylinder, in combination with the inner toothed cylinder, substantially as shown and described, for the purpose set forth.

In testimony whereof we have hereunto set our hands in the presence of two subscribing witnesses.

GEO. W. HUNGERFORD.
GEORGE S. HUNGERFORD.

Witnesses:
 W. HAUFF,
 CHAS. WAHLERS.